United States Patent [19]

Schütze et al.

[11] Patent Number: 4,652,660
[45] Date of Patent: Mar. 24, 1987

[54] PROCESS FOR PREPARING A THIOINDIGO DERIVATIVES COMPRISING CYCLIZING IN A LIQUID MIXTURE OF AN ALUMINIUM HALIDE AN ALKALI METAL HALIDE, AND A CARBOXAMIDE OR SULFONAMIDE

[75] Inventors: Detlef-Ingo Schütze, Cologne; Klaus Wunderlich, Leverkusen, both of Fed. Rep. of Germany

[73] Assignee: Bayer Aktiengesellschaft, Leverkusen, Fed. Rep. of Germany

[21] Appl. No.: 755,048

[22] Filed: Jul. 15, 1985

[30] Foreign Application Priority Data

Jul. 25, 1984 [DE] Fed. Rep. of Germany ....... 3427401

[51] Int. Cl.⁴ ................. C09B 7/10; C07D 333/64; C07D 409/04
[52] U.S. Cl. ....................... 549/56; 549/52; 549/54; 549/55
[58] Field of Search ................ 549/52, 54, 55, 56

[56] References Cited

U.S. PATENT DOCUMENTS

| | | | |
|---|---|---|---|
| 2,158,032 | 6/1938 | Lubs et al. | 549/52 |
| 2,914,539 | 11/1959 | Mory et al. | 549/52 |
| 3,503,875 | 3/1970 | Grigoriu | 549/52 |
| 4,260,778 | 4/1981 | Schütze et al. | 549/52 |
| 4,395,527 | 7/1983 | Berger | 528/26 |

*Primary Examiner*—Henry R. Jiles
*Assistant Examiner*—J. G. Mullins
*Attorney, Agent, or Firm*—Sprung Horn Kramer & Woods

[57] ABSTRACT

Process for preparing thioindigo compounds of the formula

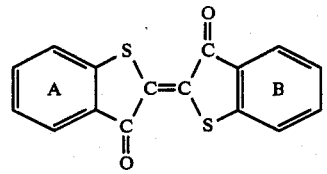

in which
A and B denote identical or different, optionally substituted benzene rings or benzene rings to which may be joined further carbocyclic and heterocyclic rings, characterized in that compounds of the formulae

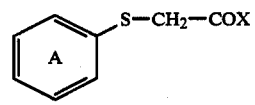

and/or

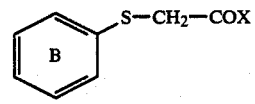

in which
A and B have the abovementioned meaning and
X denotes halogen, such as bromine and preferably chlorine, are reacted in a liquid mixture of an aluminium halide, an alkali metal halide and a carboxamide or sulphonamide, and the resulting intermediate product is subsequently, if desired after prior isolation, oxidized in a manner known per se, and the batch is worked up for the compounds of the formula (I).

13 Claims, No Drawings

PROCESS FOR PREPARING A THIOINDIGO DERIVATIVES COMPRISING CYCLIZING IN A LIQUID MIXTURE OF AN ALUMINIUM HALIDE AN ALKALI METAL HALIDE, AND A CARBOXAMIDE OR SULFONAMIDE

The invention relates to a new process for preparing thioindigo compounds.

Processes for preparing thioindigo compounds, in particular 4,4',7,7'-tetrachlorothioindigo, have been known for decades. Thioindigo and its derivatives are generally prepared either directly from the corresponding arylthioglycolic acid or via the corresponding acid chloride. In either case it is possible to isolate the corresponding intermediate product, namely 3-hydroxythionaphthene, which is converted by oxidation into thioindigo or its derivatives.

As long ago as German Patent No. 241,910, symmetrical thioindigo compounds were obtained by reacting substituted arylthioglycolic acids with chlorosulphonic acid at 35° C. In German Offenlegungsschrift No. 2,457,703 and Soviet Patent No. 327,218, 2,5-dichlorophenylthioglycolic acid is likewise reacted in chlorosulphonic acid, but in these instances isolation is of a mixture of tetrachlorothioindigo and 4,7-dichloro-3-hydroxythionaphthene or pure 4,7-dichloro-3-hydroxythionaphthene, which is then oxidized with air or sodium polysulphide to tetrachlorothioindigo.

While in these processes the reaction of the arylthioglycolic acids is carried out in pure chlorosulphonic acid, the reaction of the arylthioglycolic acids is carried out in German Offenlegungsschrift No. 3,117,055 in a mixture of chlorosulphonic acid and a halide of an inorganic acid, such as, for example, thionyl chloride or phosphorus(III) chloride.

In a further method, described in U.S. Pat. No. 2,158,032, arylthioglycolic acids are converted with phosphorus trichloride in chlorobenzene or similar solvents to the corresponding acid chlorides which, in the presence of aluminum chloride, are then cyclized to give the 3-hydroxythionaphthene derivatives and subsequently oxidized to the thioindigo derivatives.

In another process, German Patent No. 197,162, arylthioglycolic acids are first converted into the acid chlorides, which are then cyclized with aluminum chloride and subsequently oxidized with complex iron(III) salts. The yields of this process are not very high.

The final citation shall be to the process of German Offenlegungsschrift No. 2,825,313. In said process, the arylthioglycolic acid is likewise initially converted into the corresponding acid chloride. The acid chloride is then cyclized in a melt comprising sodium chloride/sulphur dioxide/aluminum chloride. The optionally substituted 3-hydroxythionaphthene is subsequently oxidized, for example with air, to the thioindigo derivative.

It has now been found, surprisingly, that thioindigo and its derivatives are obtained in advantageous manner when the acid halides of arylthioglycolic acids are reacted in a liquid mixture of an aluminum halide, an alkali metal halide and a carboxamide or sulphonamide, and the resulting reaction product, namely the 3-hydroxythionaphthene derivative, is, if desired after prior isolation, oxidized, in a manner known per se, and the batch is worked up for the expected thioindigo derivatives.

The thioindigo compounds which are obtainable according to the invention can be represented by the formula

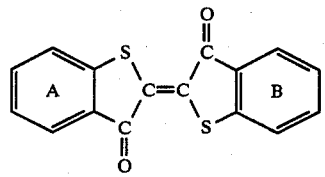 (I)

in which

A and B signify identical or different, optionally substituted benzene rings or benzene rings to which may be joined further carbocyclic and heterocyclic rings.

These compounds are prepared from compounds of the formulae

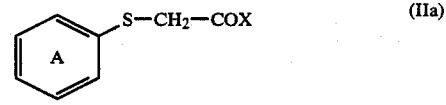 (IIa)

and/or

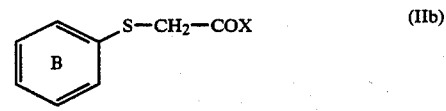 (IIb)

in which

A and B have the abovementioned meaning and

X signifies halogen, such as bromine and preferably chlorine, which are reacted in a liquid mixture of an aluminum halide, an alkali metal halide and a carboxamide or sulphonamide.

The resulting 3-hydroxy-1-thionaphthene derivative is subsequently and if desired after prior isolation oxidized in a manner known per se (see for example German Offenlegungsschrift No. 2,457,703), and the batch is worked up for the compounds of the formula (I).

The process is suitable in particular for preparing compounds of the formula (I) in which A and B signify benzene rings which are unsubstituted or which each carry 1, 2, 3 or 4 substituents from the group comprising halogen, nitro, trifluoromethyl, alkyl, alkoxy, aryloxy, acylamino, alkylmercapto and —COR, where R stands for alkyl, aryl, alkoxy or optionally substituted amino, or for preparing compounds of the formula (I) in which the optionally monosubstituted or disubstituted rings A and B are joined to a carbocyclic or heterocyclic aromatic ring.

The preparation goes particularly smoothly towards compounds of the formula (I) in which the rings A and B are unsubstituted or each carry 1, 2, 3 or 4 substituents from the group comprising chlorine, bromine, nitro, $C_1$-$C_4$-alkyl and $C_1$-$C_4$-alkoxy or in which the benzene rings A and B are part of an α- or β-naphthyl ring.

Particular interest deserves to go to the new process for preparing tetrachlorothioindigo of the structure

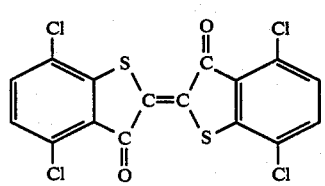

The starting compounds of the formula (IIa) and (IIb) used for carrying out the process are described in the literature or can be prepared analogously to methods described in the literature.

Suitable aluminum halides are $AlBr_3$ and preferably $AlCl_3$. The alkali metal halides which are used preferably are the chlorides and bromides of sodium and potassium, in particular NaCl.

The process according to the invention is preferably carried out with amides, N-mono-($C_1$–$C_4$-alkyl)-amides, N-di-($C_1$–$C_4$-alkyl)-amides and anilides of aliphatic $C_1$–$C_4$-alkylcarboxylic acids, optionally substituted urea, 5- to 7-membered lactams and optionally substituted benzenecarboxamides and benzenesulphonamides.

Examples of the carboxamides or sulphonamides which can be used in the invention are: dimethylformamide, dimethylacetamide, formamide, acetamide, benzamide, acetanilide, urea, thiourea, tetramethylurea, N-methylpyrrolidone, ε-caprolactam, benzenesulphonamide, and p-toluenesulphonamide. Preference is given to ε-caprolactam.

The amount of aluminum halide to be used can be varied within wide limits.

The amount per mole of acid halide of arylthioglycolic acid is for example preferably 1 to 8 moles of aluminum halide, preferably 2 to 6 moles. To this are added 0.05 to 2 moles, preferably 0.2 to 1.0 mole, of alkali metal halide, followed by 0.2 to 3 moles, preferably 0.5 to 2 moles, of carboxamide or sulphonamide, until a clear melt has formed.

The reaction temperature is within the range from about 10° C. to about 40° C., preferably within the range from about 15° C. to about 25° C. In carrying out the process in practice, the procedure is to add the acid chloride of the arylthioglycolic acid, such as, for example, the acid chloride of 2,5-dichlorophenylthioglycolic acid, to a liquid mixture of an aluminum halide, an alkali metal halide and a carboxamide or sulphonamide, such as, for example, to the mixture $AlCl_3$/NaCl/ε-caprolactam, at such a rate that the reaction temperature is between 10° C. and 40° C., preferably between 15° C. and 25° C.

The resulting 3-hydroxy-1-thionaphthene compound is subsequently oxidized to the thioindigo compound, either directly or after prior isolation. In the case of prior isolation, the melt is stirred into water which has been acidified, for example with hydrochloric acid, and is filtered off with suction. The press cake is then directly suspended in water which has been rendered alkaline by addition of bases, such as sodium hydroxide, potassium hydroxide, sodium carbonate, ammonia or barium hydroxide, and oxidized. The isolation is preferably carried out at pH 9–14. If no prior isolation is carried out, the melt is discharged directly onto water which has been rendered alkaline with one of the abovementioned bases.

The oxidation can then be carried out with oxygen, oxygen-containing gases, for example air, potassium dichromate, potassium permanganate, sodium polysulphide, complex iron(III) salts, ammonium peroxodisulphate or other oxidizing agents.

In addition to water, the oxidation can also be carried out in an aqueous-organic phase, such as water-pyridine, water-ethoxyethanol, water-ethanol, water-/diethylene glycol monoethyl ether or the like. The oxidation temperatures are between 10° C. and the boiling point of the mixture, preferably 50° C. to 100° C.

If the oxidation is carried out with oxygen or air, it is possible to speed up the oxidation reaction by means of catalysts, such as metal salts, metal oxides or metal hydroxides, in which the metal is a transition metal, for example copper, cobalt, manganese or iron. After the oxidation has ended, as can be monitored by following the decrease of the intermediate product 3-hydroxy-1-thionaphthene for example by chromatography or by measuring the redox potential, the reaction product is isolated in conventional manner, namely by filtering with suction and washing the filter cake with water, if an intermediate isolation has taken place. If not, the filtering with suction is followed by washing first with dilute sodium hydroxide solution and then with water.

To obtain optimum pigment properties for the thioindigo compounds, the reaction mixture can be stirred in the presence of an emulsifier or dispersant during the oxidation or thereafter.

Furthermore, the oxidation can be preceded or followed by the addition of an organic liquid, such as, for example, dimethyl phthalate, and to obtain optimal pigment properties the batch can be aftertreated immediately after the oxidation at temperatures of about 60° C. to about 200° C. for about 2 hours or longer.

The thioindigo compounds obtainable by the process according to the invention are used as dyestuffs in all manner of fields and substrates.

In particular the halogen-substituted thioindigo derivatives are strong brilliant pigments of excellent fastness properties, and the useful pigment properties of these products can also be obtained by subsequent finishing methods. The obtainable dyestuffs are also particularly suitable, as has been known for a long time, as vat dyestuffs for dyeing cotton.

The process according to the invention makes it possible to obtain the thioindigo compounds of the formula (I) in a smooth reaction, in high yields and in an ecologically advantageous manner, since, in particular, the process can be carried out in the absence of solvents.

EXAMPLE 1

80 g of 2,5-dichlorophenylthioglycolic acid are added to 100 ml of thionyl chloride, and the mixture is refluxed until complete reaction has been obtained. Afterwards, excess thionyl chloride is distilled off, and the acid chloride of 2,5-dichlorophenylthioglycolic acid, when it has cooled down to about 30° C., is added dropwise at about 20° C. to a melt comprising 140 g of ground aluminum chloride/14 g of dried sodium chloride/57 g of ε-caprolactam.

To prepare the melt, first the aluminum chloride is mixed with the sodium chloride and then the ε-caprolactam is gradually added.

After the acid chloride has been added, the melt is stirred at room temperature for 3 to 4 hours. The melt is then introduced into 750 g of ice/125 ml of 36% strength hydrochloric acid, the mixture is stirred for ½ hour, and the solids are filtered off with suction and washed with water. The moist press cake of 3-hydroxy-4,7-dichloro-1-thionaphthene is then suspended in 550 ml of water/35 g of 50% strength sodium hydroxide solution, and the suspension is heated to 75°–80° C. At said temperature air is then passed through for 7 hours until 3-hydroxy-4,7-dichloro-1-thionaphthene is no longer detectable by chromatography.

The mixture is filtered hot with suction, and the filter cake is washed with hot water until the water running off is at pH 10–11. The filter cake is then stirred into 2,600 ml of water/60 ml of 36% strength hydrochloric acid, and 0.5 g of a commercially available dispersant is added. The suspension is maintained at 70° C. for 1 hour and is filtered hot with suction, and the press cake is washed until neutral and dried at 60° to 70° C.

The result is 65.2 g of a reddish violet powder (89% of theory). It is a strong pigment which, on incorporation into baking finishes, produces a very fluent finish.

EXAMPLE 2

Example 1 is repeated, except that the 3-hydroxy-4,7-dichloro-1-thionaphthene is not isolated and instead the $AlCl_3$/NaCl/ε-caprolactam melt is added directly to 750 g of ice/580 g of 50% strength sodium hydroxide solution.

The mixture is then raised to 80° C., 4 g of potassium permanganate are added, and oxidation is carried out by passing in air at 80° C. for 8 hours. The temperature is finally raised to 95°–100° C. for a further 2 hours, and the solids are filtered off hot with suction, are washed with hot 5% strength sodium hydroxide solution and then with hot water.

The moist press cake is stirred into 2,600 ml of water/60 ml of 36% strength hydrochloric acid, and the suspension is heated to 70° C. and, after addition of 2.5 g of oxalic acid and 0.5 g of a commercially available dispersant, is stirred at 70° C. for ½ hour. The suspended solids are then filtered off with suction, washed with water and are dried at 60° to 70° C.

The result is 62.8 g of a reddish violet powder (85.7% of theory) which likewise is a strong pigment.

EXAMPLE 3

Example 1 is repeated, except that the completed oxidation is followed at 60° C. by treatment with 150 ml of hypochlorite solution. The mixture is then neutralized with about 20 ml of 36% strength hydrochloric acid, has 22.4 g of anhydrous sodium acetate and 30 g of dimethyl phthalate added and is heated at 140° C. in an autoclave for 8 hours.

Thereafter the ester is hydrolyzed at 80° C. with 34 g of 50% strength sodium hydroxide solution in the course of 2 hours. Afterwards the solids are filtered off with suction, are washed with water until neutral and are dried at 60° to 70° C.

The result is 64.1 g (87.5% of theory) of a reddish violet powder which, for example in PVC, is of very high dispersibility and high tinctorial strength and brilliance.

EXAMPLE 4

Example 1 is repeated, except that the acid chloride of 2,5-dichlorophenylthioglycolic acid is reacted in a melt comprising 140 g of aluminum chloride/14 g of sodium chloride/37 g of dimethylformamide.

Analogous oxidation and working up produce 61.8 g (84.4% of theory) of a reddish violet powder which has the same properties as the pigment prepared in Example 1.

EXAMPLE 5

Example 1 is repeated, except that the isolated, moist press cake of 4,7-dichloro-3-hydroxythionaphthene is suspended in 500 ml of water/98 g of 50% strength sodium hydroxide solution and is oxidized at 40° to 42° C. by addition of a solution of 38 g of potassium permanganate in 1,100 ml of water. After the oxidation has ended, the temperature is raised to 95°–100° C. for 1 hour and is maintained for 2 hours with stirring.

The mixture is then cooled down to 70° C. and is brought to pH 1 with about 95 ml of 36% strength hydrochloric acid, and 20 g of oxalic acid are added. 30 minutes later, the solids are filtered off with suction, are washed until neutral and are dried at 60° to 70° C.

The result is 62.7 g (85.6% of theory) of a reddish violet powder which is a strong pigment and, in baking finishes, produces colorations of high glaze and brilliance.

EXAMPLE 6

68.4 g of 4-chlorophenylthioglycolic acid are introduced into 100 ml of thionyl chloride, and the mixture is refluxed until complete conversion has been obtained. Afterwards, excess thionyl chloride is distilled off, and the acid chloride, when it has cooled down to about 30° C., is added dropwise at about 20° C. to a melt comprising 140 g of ground aluminum chloride/14 g of dried sodium chloride/57 g of ε-caprolactam. The melt is subsequently stirred at room temperature for 10 hours and is then discharged onto 750 g of ice/126 ml of 36% strength hydrochloric acid, the mixture is stirred for ½ hour, and the solids are filtered off with suction and washed with water.

The moist press cake is then suspended in 500 ml of water which has been rendered alkaline with 100 g of 50% strength sodium hydroxide solution, 6.8 g of iron-(III) chloride are added, and oxidation is carried out by passing in air. After about 10 hours the mixture is stirred at 95° to 100° C. for an additional hour, and is filtered hot with suction, and the filter cake is washed with hot water until the water running off is at pH 10–11.

The moist press cake is suspended in 2,500 ml of water/62 ml of 36% strength hydrochloric acid and, after addition of 0.5 g of a commercially available dispersant, the suspension is stirred at 70° C. for 1 hour. The suspended solids are then filtered off hot with suction, are washed with water and are dried at 60° to 70° C.

The result is 48.1 g of a violet powder (78% of theory). The dyestuff dyes cotton from the vat in violet shades.

EXAMPLE 7

40 g of 4-chloro-2-methylphenylthioglycolic acid are refluxed in 50 ml of thionyl chloride until complete conversion to the acid chloride has taken place. Afterwards, excess thionyl chloride is distilled off, and the acid chloride, when it has cooled down to 30° C., is added dropwise at 20° C. to a melt comprising 70 g of ground aluminum chloride/7 g of dried sodium chloride/29 g of ε-caprolactam. The melt is subsequently stirred at room temperature for 8 hours.

The melt is then discharged onto 375 g of ice/63 ml of 36% strength hydrochloric acid, the mixture is stirred for ½ hour and is filtered with suction, and the press cake is washed with water and, while still moist, is suspended in 250 ml of ice-water/50 g of 50% strength sodium hydroxide solution. The temperature is then raised to 75°–80° C., 1 g of copper sulphate, dissolved in 10 ml of water, is added, and oxidation is carried out with air in the course of about 10 hours. After stirring at 95° to 100° C. for an additional hour the mixture is filtered hot with suction, and the filter cake is washed with hot water and is again suspended in 1,200 ml of water/31 ml of 36% strength hydrochloric acid. After addition of 0.5 g of a commercially available dispersant the mixture is stirred at 70° C. for 1 hour. The solids are then filtered off with suction, washed until neutral and are dried at 60° to 70° C.

The result is 29.8 g of a red powder (84.4% of theory). The dyestuff is not only suitable as a pigment but can also be used for vat-dyeing cotton in reddish violet shades.

EXAMPLE 8

28 g of phenylthioglycolic acid are added to 50 ml of thionyl chloride, and the mixture is refluxed until complete conversion has been obtained. Afterwards, excess thionyl chloride is distilled off and the acid chloride of the phenylthioglycolic acid, when it has cooled down to about 30° C., is added dropwise with cooling at about 15° to 20° C. to a melt comprising 70 g of ground aluminum chloride/7 g of sodium chloride/28 g of ε-caprolactam.

After addition of the acid chloride the mixture is stirred at room temperature for 5 to 6 hours, is then heated to 40°-45° C. and is discharged into about 400 g of ice/63 ml of 36% strength hydrochloric acid. The mixture is filtered with suction, and the press cake of 3-hydroxy-1-thionaphthene is washed with water and, while still moist, is suspended in 250 ml of water/49 g of 50% strength sodium hydroxide solution and is oxidized at 40° to 42° C. with a solution of 19 g of potassium permanganate in 580 ml of water.

After the oxidation has ended, the temperature is raised to 90° C., and the solids are filtered off with suction and washed with hot water.

Afterwards the press cake is suspended in 1,100 ml of water, the suspension is raised to 70° C., 31 ml of 36% strength hydrochloric acid are added, and 12 g of oxalic acid are added to remove manganese dioxide. After stirring at 70° C. for an additional hour the mixture is filtered with suction, and the filter cake is washed with water until neutral and is dried.

The result is 16.5 g (66.9% of theory) of a red powder which, for example in polystyrene, produces highly fluorescent red colorations.

The dyestuffs of Examples 9 to 22 were prepared analogously to Examples 1 to 8:

| Example | Thioglycolic acid | Shade on cotton |
|---------|-------------------|-----------------|
| 9 | 3-Chlorophenylthioglycolic acid | red |
| 10 | 2-Chlorophenylthioglycolic acid | red |
| 11 | 3-Methylphenylthioglycolic acid | red |
| 12 | 2-Methylphenylthioglycolic acid | bluish red |
| 13 | 4-Methylphenylthioglycolic acid | bluish red |
| 14 | 2,4-Dichlorophenylthioglycolic acid | reddish violet |
| 15 | 2-Methyl-5-chlorophenylthioglycolic acid | red |
| 16 | 2,5-Dimethyl-4-chlorophenylthioglycolic acid | reddish violet |
| 17 | 2,4-Dichloro-5-methylphenylthioglycolic acid | reddish violet |
| 18 | 4-Nitrophenylthioglycolic acid | greenish blue |
| 19 | 4-Methoxyphenylthioglycolic acid | bluish |
| 20 | 3-Ethoxyphenylthioglycolic acid | yellowish red |
| 21 | 3-Methoxy-4-chlorophenylthioglycolic acid | brick red |
| 22 | α-Naphthylthioglycolic acid | bluish grey |
| 23 | β-Naphthylthioglycolic acid | brown |

We claim:
1. A process for preparing a thioindigo compound of the formula

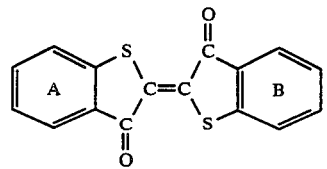

in which
A and B signify identical or different benzene rings which are unsubstituted or which each carry 1, 2, 3 or 4 substituents from the group comprising halogen, nitro, trifluoromethyl, alkyl, alkoxy, aryloxy, acylamino, alkylmercapto and —COR, where R stands for alkyl, aryl, alkoxy or optionally substituted amino or benzene rings, which are part of a α- or β-napthyl ring,
wherein a compound of the formula

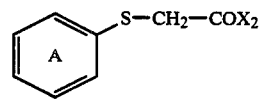

and/or

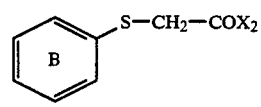

in which
A and B have the abovementioned meaning and
X signifies halogen,
is reacted in a liquid mixture of an aluminum halide, an alkali metal halide and a carboxamide or sulphonamide, and the resulting intermediate product is subsequently, if desired after prior isolation, oxidized in a manner known per se, and the batch is worked up for the thioindigo compound.

2. A process according to claim 1, wherein the aluminum halide used is AlCl$_3$.

3. A process according to claim 1, wherein the alkali metal halide used is NaCl.

4. A process according to claim 1, wherein the carboxamide or sulphonamide used are amides, N-mono-(C$_1$-C$_4$-alkyl)-amides, N-di-(C$_1$-C$_4$-alkyl)-amides and anilides of aliphatic C$_1$-C$_4$-alkylcarboxylic acids, optionally substituted urea, 5- to 7-membered lactams and optionally substituted benzenecarboxamide and benzenesulphonamide.

5. A process according to claim 1, wherein the carboxamide or sulphonamide used is dimethylformamide, dimethylacetamide, formamide, acetamide, benzamide, acetanilide, urea, thiourea, tetramethylurea, N-methylpyrrolidone, ε-caprolactam, benzenesulphonamide or p-toluenesulphamide.

6. A process according to claim 1, wherein the carboxamide used is ε-caprolactam.

7. A process according to claim 1, wherein per mole of acid halide the melt is prepared from 1 to 8 moles of aluminum halide, 0.05 to 2 moles of alkali metal halide and 0.2 to 3 moles of the carboxamide or sulphonamide.

8. A process according to claim 1, wherein the reaction is carried out at about 10° C. to about 40° C.

9. A process according to claim 1, wherein in which the rings A and B are unsubstituted or each carry 1, 2, 3 or 4 substituents from the group comprising Cl, Br, —NO$_2$, C$_1$–C$_4$-alkyl and C$_1$–C$_4$-alkoxy or in which the benzene rings A and B are part of an α- or β-naphthyl ring.

10. A process according to claim 1, wherein the thioindigo compound prepared is of the formula

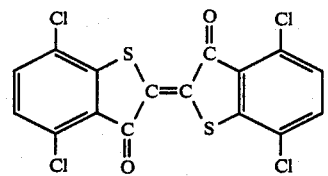

11. A process according to claim 1, wherein the thioindigo compound is prepared in the presence of ε-caprolactam as the carboxamide.

12. A process according to claim 1, wherein X is chlorine or bromine.

13. A process according to claim 8, wherein the reaction is carried out at about 15° C. to about 25° C.

* * * * *